United States Patent
Cha

(10) Patent No.: US 7,684,824 B2
(45) Date of Patent: *Mar. 23, 2010

(54) METHOD FOR TRANSMITTING MESSAGE OF MOBILE TERMINAL

(75) Inventor: Dal-Yong Cha, Seoul (KR)

(73) Assignee: LG Electronics Inc., Seoul (KR)

( * ) Notice: Subject to any disclaimer, the term of this patent is extended or adjusted under 35 U.S.C. 154(b) by 609 days.

This patent is subject to a terminal disclaimer.

(21) Appl. No.: 11/023,474

(22) Filed: Dec. 29, 2004

(65) Prior Publication Data

US 2005/0191996 A1    Sep. 1, 2005

(30) Foreign Application Priority Data

Dec. 30, 2003    (KR)    ........................ 10-2003-0100732

(51) Int. Cl.
H04M 1/00    (2006.01)

(52) U.S. Cl. ................. 455/556.1; 455/414.1; 455/466; 455/567

(58) Field of Classification Search ............... 455/556.1
See application file for complete search history.

(56) References Cited

U.S. PATENT DOCUMENTS

| | | | |
|---|---|---|---|
| 6,230,019 B1 * | 5/2001 | Lee | 455/466 |
| 6,529,742 B1 * | 3/2003 | Yang | 455/556.1 |
| 2002/0094847 A1 * | 7/2002 | Han | 455/567 |
| 2004/0214610 A1 * | 10/2004 | Tanemura et al. | 455/566 |
| 2007/0190987 A1 * | 8/2007 | Vaananen | 455/414.1 |

FOREIGN PATENT DOCUMENTS

| | | |
|---|---|---|
| CN | 1366435 A | 8/2002 |
| EP | 1 365 607 A2 | 11/2003 |
| JP | 10-190791 A | 7/1998 |
| JP | 2002101192 A | 4/2002 |
| JP | 2002-152484 A | 5/2002 |
| JP | 2003-8705 A | 1/2003 |

(Continued)

OTHER PUBLICATIONS

The Communication Operations Magazine of Guangdong province, "the operations in the GSM digital mobile communication", vol. 5, pp. 30,32,34, (1996).

(Continued)

*Primary Examiner*—Duc Nguyen
*Assistant Examiner*—Ajibola Akinyemi
(74) *Attorney, Agent, or Firm*—Birch, Stewart, Kolasch & Birch, LLP

(57) ABSTRACT

A method for transmitting a message from a mobile terminal includes determining whether a specific event that occurs during the transmission may be disregarded. The specific event may be an event such as a closing/opening of a folder, a flip, or a sliding cover of the mobile terminal or a receipt of a call from another party. Normally, the specific event causes the mobile terminal to terminate the transmission of the message. However, the user may specify that the specific event may be disregarded, and the transmission may continue without disruption. As an example, an event disregard mode may be set via a menu for one or more specific events to indicate that the specific events may be disregarded. Thus, user's convenience is enhanced and a fast communication service is provided to users.

21 Claims, 4 Drawing Sheets

FOREIGN PATENT DOCUMENTS

| | | |
|---|---|---|
| JP | 2003-229931 A | 8/2003 |
| JP | 2004-353442 A | 12/2004 |
| KR | 1020020030773 A | 4/2002 |
| KR | 2002-0036593 A | 5/2002 |
| KR | 2003-0034964 A | 5/2003 |
| KR | 2003-0049436 A | 6/2003 |
| WO | WO-02/082786 A1 | 10/2002 |
| WO | WO-03/010983 A2 | 2/2003 |

OTHER PUBLICATIONS

Nokia unveils the 6600, Jun. 16, 2003, Sundgot Jorgen.
User's Guide, Nokia 6600, pp. 1-10, 66-102, Nokia 2004.
"Nokia continues to gain market share in phones with excellent profitability", Jul. 17, 2003, Nokia Corporate Press/Press Releases/Archive/Archive ShowPressRelease, retrieved from website: www.nokia.com/presse, "http://www.nokia.com/press/press-releases/archive/archiveshowpressrelease?newsid_911104".

* cited by examiner

FIG. 5(a)
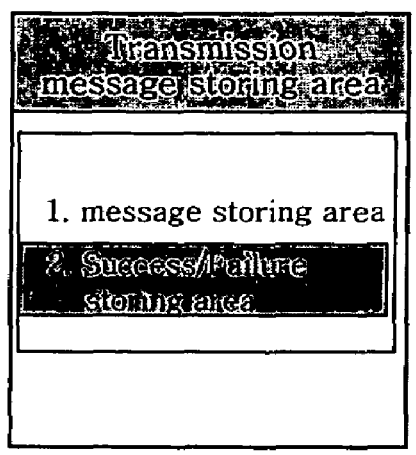
(a)
Select no. 2
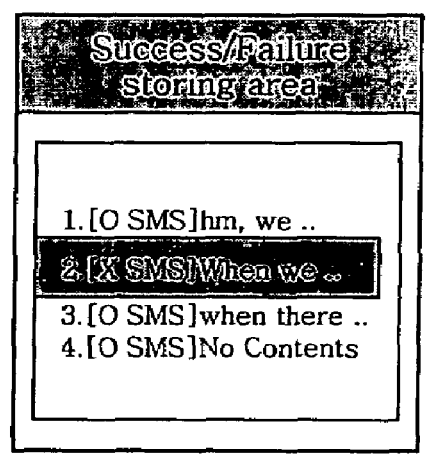
O : *Transmission successful*
X : *Transmission failed*
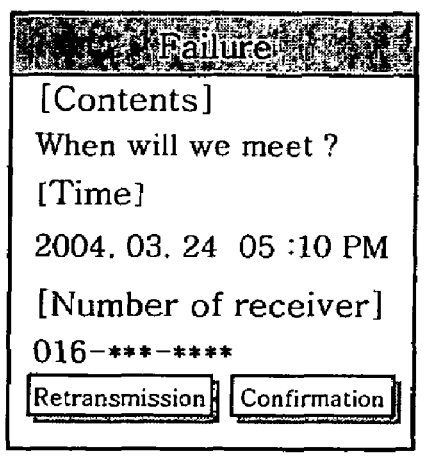
Select no. 2
FIG. 5(c)    FIG. 5(b)

US 7,684,824 B2

METHOD FOR TRANSMITTING MESSAGE OF MOBILE TERMINAL

This application claims priority under 35 USC 119(a) of Korean patent application serial number 10-2003-0100732, filed on Dec. 30, 2003.

BACKGROUND OF THE INVENTION

1. Field of the Invention

The present invention relates to a message transmission from/to a mobile terminal and, more particularly, to method and apparatus for transmitting a message from/to mobile terminals.

2. Description of the Related Art

With the rapid development in communication technologies, in addition to voice related services, a mobile terminal can provide various supplementary services including a message transmission service, a wireless Internet, games and/or a bell or ringer sound downloading. Among the supplementary services, the message transmission service has been developed and is being provided by mobile communication service provider. The message transmission service includes a SMS (short message service) for transmitting text data within 80 bytes for example. The service also includes a MMS (Multimedia Message Service: multimedia) for transmitting music, images, movies, etc. The message being transmitted and received may be a combination of SMS and MMS.

A user can create a message to be transmitted by using certain keys provided on the mobile terminal and then may transmit the message to another party.

However, in a conventional method, when a specific event occurs such as a user closing a folder (flip or a sliding cover) of the mobile terminal while the message is being transmitted, the message transmission is automatically terminated. For example, after the user initiates transmission of a SMS message and closes the folder of the mobile terminal before transmission of the SMS message is completed, the SMS message transmission is terminated, i.e. disrupted prior to completion.

Thus, in the conventional method, after the user initiates transmission of the message, he/she must wait for the corresponding message to be completely transmitted before closing the folder of the terminal. If the folder is inadvertently closed while the message is being transmitted, the user must recreate the message. This problem is more serious in case of the MMS. For example, the MMS typically includes more data than the SMS. Hence, the flip must be maintained open for a longer time to complete transmission of the MMS.

SUMMARY OF THE INVENTION

Accordingly, an object of the present invention is to provide a method and an apparatus for transmitting a message of a mobile terminal capable of performing transmission of a message continuously, i.e. without disruption, even if a specific event occurs that normally causes a message termination while the message is being transmitted. The specific event that would normally cause an interruption may be disregarded, i.e. ignored, by setting an event disregard mode for the specific event.

To achieve at least the above objects in whole or in parts, a method embodiment is provided for transmitting a message of a mobile terminal, in which during a transmission of the message, if a specific event does not occur, the message transmission is continued. However, if the specific event does occur, it is determined whether an event disregard mode has been set for the specific event.

If the event disregard mode has not been set for the specific event, transmission of the message is interrupted. On the other hand, if the event disregard mode has been set for the specific event, the message transmission is continued without disruption.

BRIEF DESCRIPTION OF THE DRAWINGS

The invention will be described in detail with reference to the following drawings in which like reference numerals refer to like elements wherein:

FIGS. 5(a)-5(c) illustrate an exemplary embodiment of checking whether the SMS/MMS message has been successfully transmitted.

DETAILED DESCRIPTION OF THE PREFERRED EMBODIMENTS

An exemplary embodiment of the present invention will now be described in detail with reference to the accompanying drawings.

One or more embodiments are proposed for performing a transmission of a message without interruption even if a specific event occurs that normally terminates the message transmission. For this purpose, the embodiment allows an event disregard mode to be set for one or more specific events, for example through a menu. When the disregard mode is set for a specific event, the message continues to be transmitted without disruption even if the specific event occurs. Specific events may include closing/opening of a folder, flip or a sliding cover of the mobile terminal; receipt of a call from another party; etc. It should be noted that a message can be a SMS, a MMS, or a combination of both.

Figure 1:
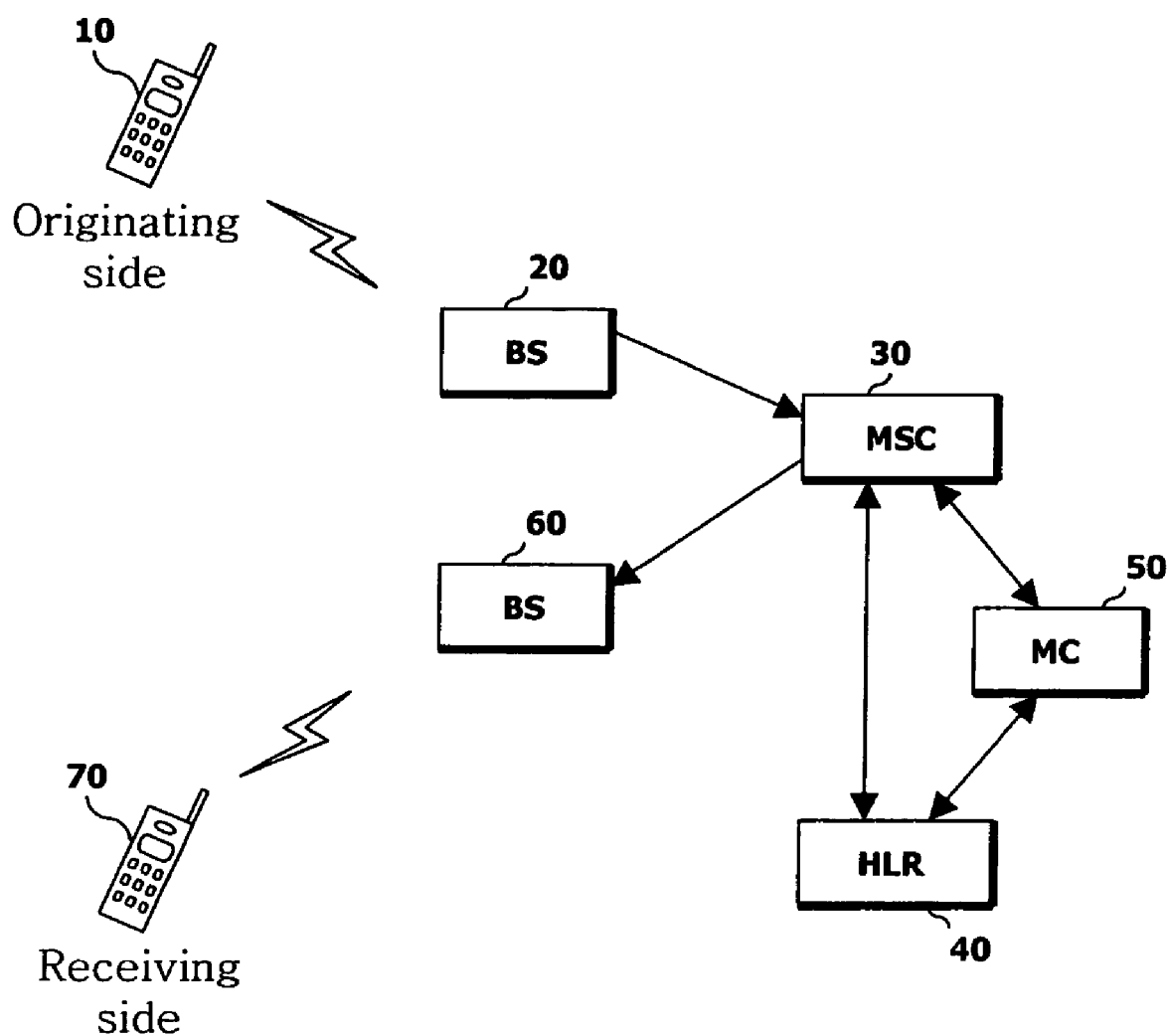
FIG. 1 illustrates a construction of a mobile communication system adopted for an embodiment of the present invention.

FIG. 1 illustrates a mobile communication system according to an embodiment of the present invention.

As illustrated in FIG. 1, the mobile communication system may include mobile terminals (MTs) 10 and 70; base stations (BSs) 20 and 60, a Mobile Switching Center (MSC) 30, a Home Location Register (HLR) 40, and a Message Center (MC) 50.

The BSs 20 and 60 may communicate with MTs 10 and 70 using a radio interface. The BSs 20 and 60 may also control radio and cable links, and perform a handoff function to maintain continuity of call communication while a user (i.e. the mobile terminal) is moving.

To process origination and reception requests received from the mobile terminals 10 and 70, the MSC 30 may cooperate with another MSC and perform inquiry on a subscriber from the HLR 40.

When the MSC 30 receives a message (SMS, MMS, combination, etc.) from the mobile terminals 10 and 70, it may transfer the message to the MC 50. Conversely, if the MSC 30 receives the message from the MC 50, the MSC 30 may transfer the message to the BSs 20 and 60. In this way, the message can be transmitted/received to/from the mobile terminals 10 and 70, for example through a paging channel. In FIG. 1, the mobile terminal 10 is designated as the originating side, i.e. the message transmitter and the mobile 70 is designated as the receiving side. However, the invention is not so limiting. It should be noted that both mobile terminals may have the capability to both transmit and receive.

The HLR 40 may store subscriber information and position information of the mobile terminals and designate a path to the mobile terminals with respect to received calls.

The MC 50, an independent node connected to the HLR 40 and the MSC 30, may recognize positions of the mobile terminals and may also transfer messages to mobile subscribers.

In addition, when the MC 50 transmits the message, if a receiving mobile terminal is in a state so that it cannot receive the message, the MC 50 may temporarily store the message for a predetermined period of time and then transmit the message to the receiving mobile terminal. For example, the receiving mobile terminal may be in a burst state at an arbitrary point. As another example, the receiving mobile terminal may be itself transmitting or receiving another message.

When the MC 50 receives the message from the mobile terminals 10 and 70 through the BSs 20 and 60 and the through MSC 30, the MC 50 may temporarily store the received message in a queue.

Thereafter, the MC 50 may identify the mobile terminal of a receiver, the identity of which is transmitted together with the message. The MC 50 may also trace a position of the corresponding receiver mobile terminal through cooperation with the HLR 40. Once the position of the receiver mobile terminal is determined, the MC 50 may transmit the message.

The messaging operation of the mobile communication system constructed as described above may be described as follows.

Figure 2:
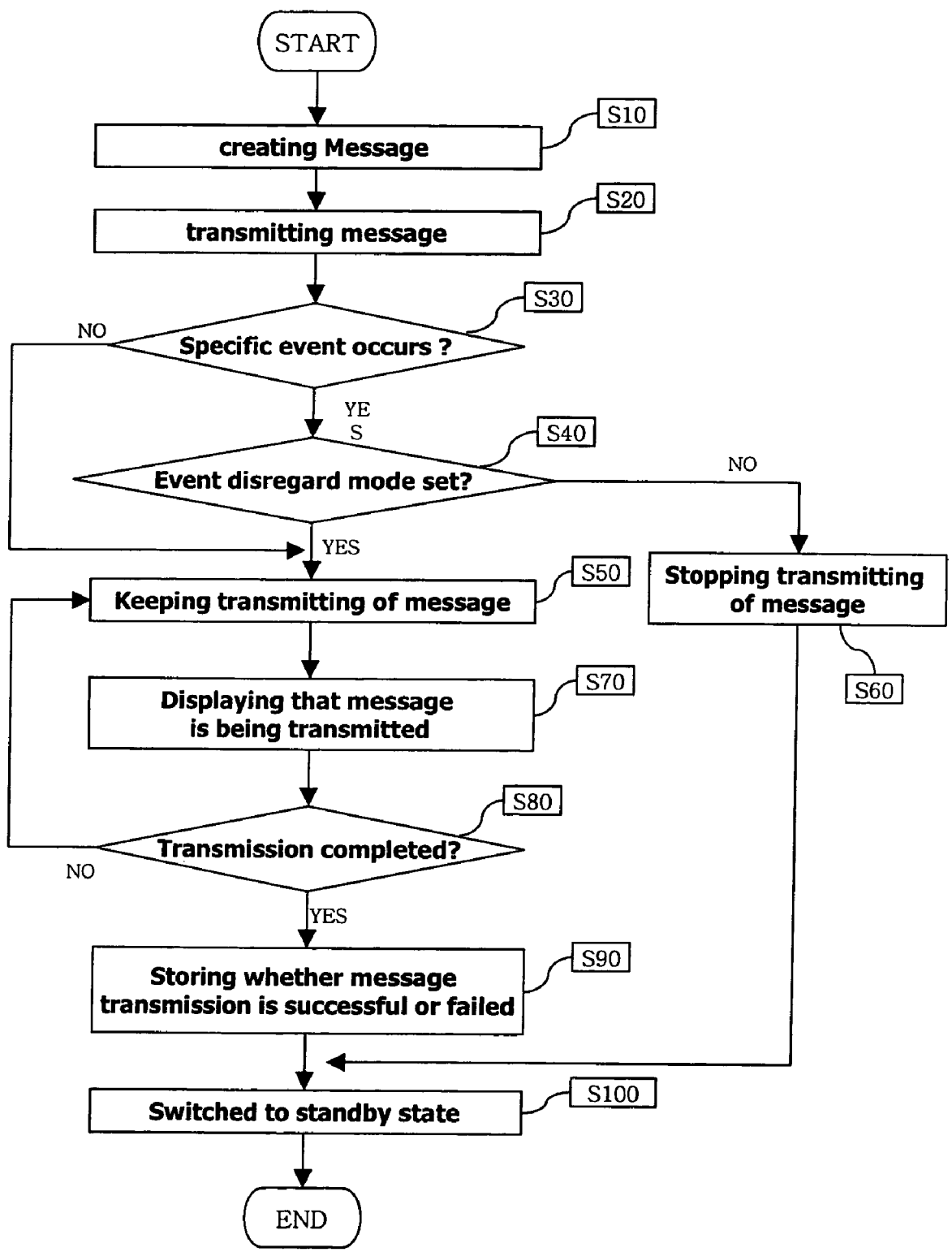
FIG. 2 is a flow chart illustrating a method for transmitting a message of a mobile terminal in accordance with an embodiment of the present invention.

FIG. 2 is a flow chart of a method for transmitting a message from a mobile terminal in accordance with an embodiment of the present invention. More specifically, the flowchart illustrates an exemplary operation that is carried out in the event of an occurrence of a specific event.

Figure 4:
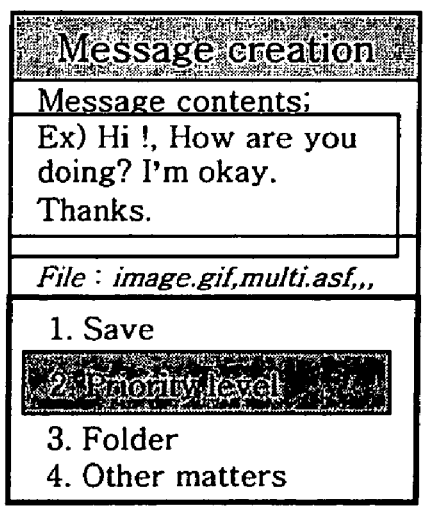
FIG. 4 illustrates an exemplary embodiment of the SMS/MMS message.

As shown in FIG. 2, a user may create a message (SMS, MMS, combination) as desired (step S10). The user may also create information on storing of the message, a priority level of the message, a type of storage area or the like as shown in FIG. 4. Referring back to FIG. 2, when the message is created, the user may initiate transmission of the message through the mobile terminal, for example by using a certain origination key (step S20).

Thereafter, if a specific event, such as closing of the folder of the mobile terminal or receiving a call from another party, occurs while the message is being transmitted (step S30), the mobile terminal may determine whether the specific event may be disregarded, i.e. whether the disregard mode has been set for the specific event (step S40).

If the event disregard mode has not been set for the specific event, the mobile terminal may terminate transmission of the message (step S60) and then may switch to a standby state (step S100).

If, however, the event disregard mode has been set for the specific event, the mobile terminal may continue transmission of the message (steps S40 and S50) without interruption.

In other words, if the event disregard mode has been set for the specific event, the mobile terminal may disregard the specific event when it occurs and continue transmission of the message. The mobile terminal may also inform the user about the transmission state of the message (steps S50 and S70). In other words, the mobile terminal may inform the user that the message is being transmitted during the transmission of the message.

For example, if the mobile terminal has an external LCD screen, the mobile terminal may inform the user that the message is being transmitted on the external LCD screen. The information may be through text or through animation. As another example, a blinking light may be used to indicate that the transmission of the message is taking place. The blinking light may be provided via an LED device on the exterior of the mobile terminal. Further, if the specific event that occurs during the transmission of the message is a receipt of a call from another party, the mobile terminal may inform the user accordingly.

Thereafter, when the SMS/MMS message transmission is completed (step S80), the mobile terminal may store a message transmission success/failure information in a transmission message storing area of a memory as shown in FIGS. 5(*a*)-5(*c*) (step S90). For example, when the message transmission is completed, the mobile terminal may store an indication of whether or not the transmission of the message has been successful. This indication may be stored in a success/failure storing area as shown in FIGS. 5(*a*) and 5(*b*).

Accordingly, when the user selects the success/failure storing area (item 2) from the transmission message storing area of FIG. 5(*a*), the mobile terminal may display the message transmission success/failure information as shown in FIG. 5(*b*). The message or a portion of the message may be displayed along with the success or failure indication.

In FIG. 5(*c*), an example of a message transmission success/failure information of a failed message transmission is illustrated. As illustrated, the message which failed to be transmitted may be stored so that it can be retransmitted according to a user's desires. The failed message may be stored as a module. The transmission time and the recipient's phone number may also be recorded as part of the message transmission success/failure information.

If the original transmitted message includes a MMS message content, the transmission success/failure information may also include a portion of the content of the transmitted MMS message. One or more of the multimedia files added to make up the original MMS message may or may not be included in the message transmission success/failure information.

When the message transmission success/failure information is stored, the mobile terminal may switch to a standby state. Also, if the disregarded specific event is the receipt of a call from another party, the mobile terminal may switch operation to perform the corresponding operation or otherwise switch to a state to receive the call.

Figure 3:
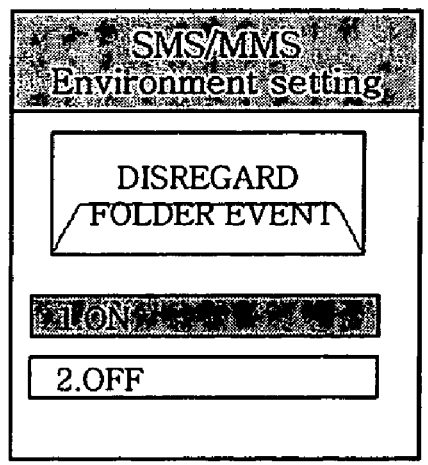
FIG. 3 illustrates an exemplary embodiment of a SMS/MMS environment set menu for setting an event disregard mode for a specific event.

The disregard mode may be set in multiple ways. FIG. 3 is an embodiment of the present invention for setting the event disregard mode. As shown, the user may set the disregard mode for a specific event, in this instance a folder event, (i.e., a closing of phone's outer cover) is set to the "on" condition, meaning that the mobile terminal will disregard a closing of the phone's outer cover, and continue to transmit a message. When set to 'ON', an occurrence of the event will be disregarded and the transmission of the message will not be interrupted. When set to 'OFF' and the specific event occurs, the message transmission may be interrupted and terminated.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for controlling a mobile terminal, the method comprising:

entering an event disregard mode and displaying an event disregard menu option on a display of the mobile terminal for selecting a plurality of specific events that are to be disregarded whenever a message is transmitted on the mobile terminal to at least one other mobile terminal, said plurality of specific events causing transmission of the message to fail, and said disregard menu option including an ON and an OFF selectable item for each of the plurality of specific events to indicate whether or not the plurality of specific events are to be disregarded, respectively, whenever the message is transmitted on the mobile terminal;

receiving a selection signal indicating whether or not at least one of the plurality of specific events are to be disregarded whenever the message is transmitted on the mobile terminal;

entering a message creating mode and creating the message to be transmitted;

receiving a transmission selection signal indicating a request to transmit the created message to said at least one other terminal;

determining, by the mobile terminal, if one of the plurality of specific events occurs during the transmission of the created message;

determining if the ON selectable item has been selected for said one of the plurality of specific events when it is determined that said one of the specific events occurred during the transmission of the message; and selectively continuing the transmission of the message when it is determined that the ON selectable item in the event disregard mode for said one of the plurality of specific events has been set and terminating the transmission of the message when it is determined that the OFF selectable item in the event disregard mode for said one of the plurality of specific events has been set, wherein the event disregard mode is entered before and is independent of the message creation mode such that the plurality of specific events can be set to be disregarded or not disregarded without having to set the disregard mode for the plurality of specific events each time a message is created and transmitted.

2. The method of claim 1, wherein said one of the plurality of specific event comprises:

a closing/opening of a folder, a flip or a sliding cover of the mobile terminal.

3. The method of claim 1, wherein the message includes a SMS (Short Message Service) or a MMS (Multimedia Message Service) or a combination of SMS and MMS.

4. The method of claim 1, further comprising:

informing a user of a message transmission state during the transmission of the message; and storing message transmission success/failure information related to the success/failure status of the transmission of the message upon completion of the transmission of the message.

5. The method of claim 4, wherein the message transmission success/failure information includes at least one of a transmission time of the transmission of the message, and a phone number of a recipient.

6. The method of claim 5, further comprising:

storing the message transmission success/failure information in a success/failure storing area of the mobile terminal.

7. The method of claim 5, wherein the message transmission success/failure information includes a portion of a content contained within the message.

8. The method of claim 7, wherein the message transmission success/failure information is such that one or more attachments making up the message are included.

9. The method of claim 5, wherein the user is informed of the message transmission state through a display unit.

10. The method of claim 9, wherein the specific display unit is an LCD or an LED.

11. The method of claim 10, wherein the step of informing the user of the message transmission step comprises at least one of:

displaying text based information or animation or both if the display unit is an LCD; and blinking the display unit if the display unit is an LED.

12. A mobile communication terminal, comprising:

a wireless transmission unit configured to communicate with at least one other terminal;

an input unit configured to enter an event disregard mode;

a display unit configured to display, when the event disregard mode is entered, an event disregard menu option for selecting a plurality of specific events that are to be disregarded whenever a message is transmitted on the mobile terminal to at least one other mobile terminal, said plurality of specific events causing transmission of the message to fail, and said disregard menu option including an ON and an OFF selectable item for each of the plurality of specific events to indicate whether or not the plurality of specific events are to be disregarded, respectively, whenever the message is transmitted on the mobile terminal;

a control unit configured to receive a selection signal indicating whether or not at least one of the plurality of specific events are to be disregarded whenever the message is transmitted on the mobile terminal, to enter a message creating mode for creating the message, to receive a transmission selection signal indicating a request to transmit the created message to said at least one other terminal, to determine if one of the plurality of specific events occurs during the transmission of the created message, to determine if the ON selectable item has been selected for said one of the plurality of specific events when it is determined that said one of the specific events occurred during the transmission of the message, and to selectively continue the transmission of the message when it is determined that the ON selectable item in the event disregard mode for said one of the plurality of specific events has been set and terminating the transmission of the message when it is determined that the OFF selectable item in the event disregard mode for said one of the plurality of specific events has been set, wherein the event disregard mode is entered before and is independent of the message creation mode such that the plurality of specific events can be set to be disregarded or not disregarded without having to set the disregard mode for the plurality of specific events each time a message is created and transmitted.

13. The mobile communication terminal of claim 12, wherein said one of the plurality of specific events comprises a closing/opening of a folder, a flip or a sliding cover of the mobile terminal.

14. The mobile communication terminal of claim 12, wherein the message includes a SMS (Short Message Service) or a MMS (Multimedia Message Service) or a combination of SMS and MMS.

15. The mobile communication terminal of claim 12, further comprising:
   a display unit configured to display information informing a user of a message transmission state during the transmission of the message; and
   a memory unit configured to store message transmission success/failure information related to the success/failure status of the transmission of the message upon completion of the transmission of the message.

16. The mobile communication terminal of claim 15, wherein the message transmission success/failure information includes at least one of a transmission time of the transmission of the message, and a phone number of a recipient.

17. The mobile communication terminal of claim 16, wherein the memory unit is further configured to store the message transmission success/failure information in a success/failure storing area of the mobile terminal.

18. The mobile communication terminal of claim 16, wherein the message transmission success/failure information includes a portion of a content contained within the message.

19. The mobile communication terminal of claim 18, wherein the message transmission success/failure information is such that one or more attachments making up the message are included.

20. The mobile communication terminal of claim 15, wherein the display unit is an LCD or an LED.

21. The mobile communication terminal of claim 20, wherein the controller is further configured to control the display unit to display information informing the user of the message transmission by displaying text based information or animation or both if the display unit is an LCD, and by blinking the display unit if the display unit is an LED.

* * * * *